United States Patent [19]
Maier

[11] Patent Number: 5,348,132
[45] Date of Patent: Sep. 20, 1994

[54] CARRIAGE FOR A CONVEYOR FOR PIECE GOODS

[75] Inventor: Willy Maier, Kloten, Switzerland

[73] Assignee: Grapha-Holding AG, Hergiswil, Switzerland

[21] Appl. No.: 98,897

[22] Filed: Jul. 29, 1993

[30] Foreign Application Priority Data

Jul. 30, 1992 [CH] Switzerland .............. 02397/92

[51] Int. Cl.⁵ .................................................. B65G 47/38
[52] U.S. Cl. .................................................. 198/365
[58] Field of Search .................................... 198/365

[56] References Cited

U.S. PATENT DOCUMENTS

| | | | |
|---|---|---|---|
| 4,089,404 | 5/1978 | Venzke | 198/365 |
| 4,102,448 | 7/1978 | Wolbrink et al. | 198/365 |
| 4,635,785 | 1/1987 | Prydtz | 198/365 |
| 4,982,828 | 1/1991 | Nicolson et al. | 198/365 |
| 4,984,674 | 1/1991 | Fortenberry | 198/365 |
| 5,018,928 | 5/1991 | Hartlepp | 198/365 X |
| 5,092,437 | 3/1992 | Maier | 192/8 R |

FOREIGN PATENT DOCUMENTS 0452271 10/1991 European Pat. Off.
2318008 10/1973 Fed. Rep. of Germany.

Primary Examiner—James R. Bidwell
Attorney, Agent, or Firm—Spencer, Frank & Schneider

[57] ABSTRACT

A carriage for a conveyer for piece goods. The carriage is provided with a tilting device that is fastened to a carriage frame and is equipped with a push rod which is used to tilt a transporting tray disposed on a horizontal shaft. When the transporting tray is being tilted, for example, a postal package disposed on the tray is transferred at a preselected destination, for example, to a chute. A locking device equipped with detent pawls, an adjustment disc and a locking disc, automatically locks the transporting tray in its predetermined oblique position. In this way the transporting tray is prevented from tilting back once a sliding block provided for the pivoting is no longer in engagement with the tilting device in the region of the tilting path. The sliding block can thus be shorter than the tilt path.

11 Claims, 2 Drawing Sheets

CARRIAGE FOR A CONVEYOR FOR PIECE GOODS

CROSS REFERENCE TO RELATED APPLICATION

This application claims the priority of Application Ser. No. CH 02 397/92-7, filed Jul. 30, 1992, in Switzerland, the subject matter of which is incorporated herein by reference.

BACKGROUND OF THE INVENTION

The present invention relates to the carriage of a conveyor for piece goods that includes a lockable transporting tray supported on the carriage frame and a tilting device for tilting the transporting tray.

A carriage of this type is disclosed in European Patent EP-A-0,452,271 (which corresponds to U.S. Pat. 5,092,437). In postal processing centers, railroad stations, airports and printing plants, conveyors with several carriages of this type coupled together have been found to be quite satisfactory. The conveyors are preferably sorting conveyors which may have a length of more than 100 m and, for example, include 200 carriages. The carriages are loaded at intake locations, for example with a postal package that travels, after being transported over a certain path, to a preselected target location where it is discharged by tilting the transporting tray and sliding over chutes and conveyor belts to reach its destination. At the final destination, the tilting of the transporting trays is initiated, for example, by means of pneumatically actuated sliding blocks. In such a sorting conveyor, malfunctions particularly during unloading of the carriages, must be avoided at all costs.

SUMMARY OF THE INVENTION

It is an object of the present invention to provide a carriage of the above-mentioned type which operates even more reliably than in the past particularly with respect to the unloading process. The carriage is to be suitable also for transporting heavy piece goods, for example those weighing 30 kg or more.

This is accomplished in a carriage of the above type in that the transporting tray is automatically locked in the oblique position predetermined for the discharge of a piece of goods and adjustment means are provided for unlocking the mentioned oblique position by means of the tilting device.

In the carriage according to the invention, the transporting tray is thus locked precisely in that oblique position in which the piece of goods to be discharged is to slide off the transporting tray. In this way the transporting tray is prevented from inadvertently tilting back if, for example, a large and heavy package has not yet reached the middle of the transporting tray when leaving the tilting arrangement. A significant advantage of the present invention is thus that the tilting arrangement can be shorter than the entire tilt path and that, when transporting large and heavy pieces of goods, inadvertent tilting back of the transporting tray is reliably prevented in such a case as well. If a carriage according to the invention is employed, the sliding blocks for tilting the transporting trays can be made substantially shorter than the tilt path without thus incurring the danger of additional malfunctions. Advantageous modifications of the invention are disclosed in the dependent claims. Further advantageous features and advantages will become evident from the description below and from the drawing figures.

BRIEF DESCRIPTION OF THE DRAWINGS

One embodiment of the invention will now be described in greater detail with reference to the drawing figures, in which.

DETAILED DESCRIPTION OF THE PREFERRED EMBODIMENT

Figure 3:
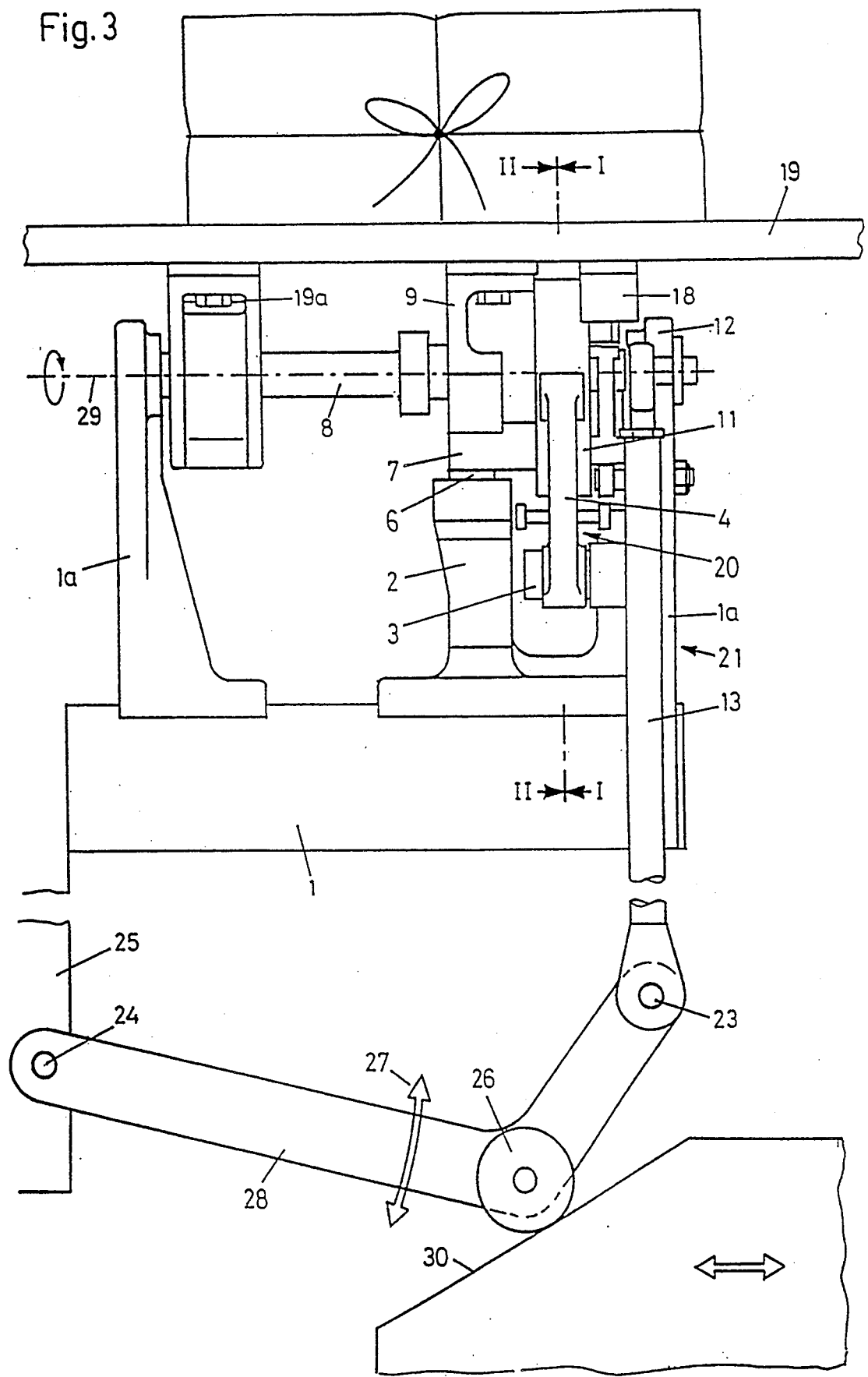
FIG. 3 is a partial view of the carriage according to the invention.

The carriage includes a frame 1 equipped with vertically upwardly extending carriers 1a at which a horizontal shaft 8 is rotatably mounted. The underside of a carrying tray 19 is fixed to shaft 8 by means of a holder 19a and a lock support 9. The carriage runs on rails that are not shown here and can be moved by means of a known drive chain, also not shown here, in the direction of the axis 29 of shaft 8 shown in FIG. 3.

Figure 2:
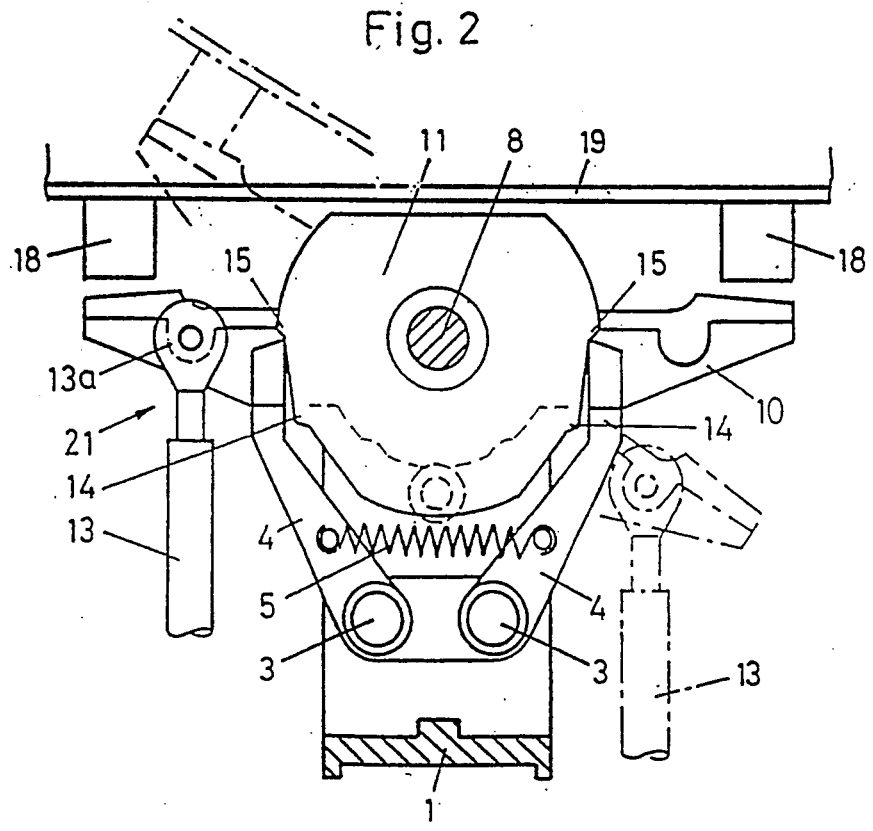
FIG. 2 is a sectional view along line II—II of FIG. 3.

By means of a tilting device 21, carrying tray 19 can be tilted at a preselected target location in the one or the other direction of rotation of shaft 8. For this purpose, tilting device 21 is provided with two push rods 13 which are each connected by way of a joint 13a at their upper ends with a release arm 10. This release arm 10 is, as shown in FIG. 2, a dual-arm lever that projects radially outwardly from shaft 8. At their other ends, push rods 13 are each connected with an articulated lever 28, likewise by way of a joint 23. The articulated lever in turn is connected, by way of a joint 24 at the other end, with a downwardly projecting beam 25 of frame 1. A roller 26 is attached to lever 28. In order to pivot the lever in the direction of arrow 27, roller 26 can be brought into engagement with a pneumatically actuatable sliding block 30 shown in FIG. 3. Depending on which lever 28 is pivoted about the axis of joint 24, the release arm 10 is pivoted about shaft 8 in the one direction or the other. In the view according to FIG. 2, raising of the left push rod 13 causes release arm 10 to be moved from the position shown in solid lines to the position shown in dash-dot lines. In doing so, the left arm of release arm 10 abuts, after a short rotation, against a buffer 18 fastened on the underside of the carrying tray 19 and correspondingly pivots carrying tray 19 about shaft 8. If tray 19 is to be tilted counterclockwise, a buffer 18 shown on the right in the drawing is correspondingly charged by release arm 10.

Figure 1:
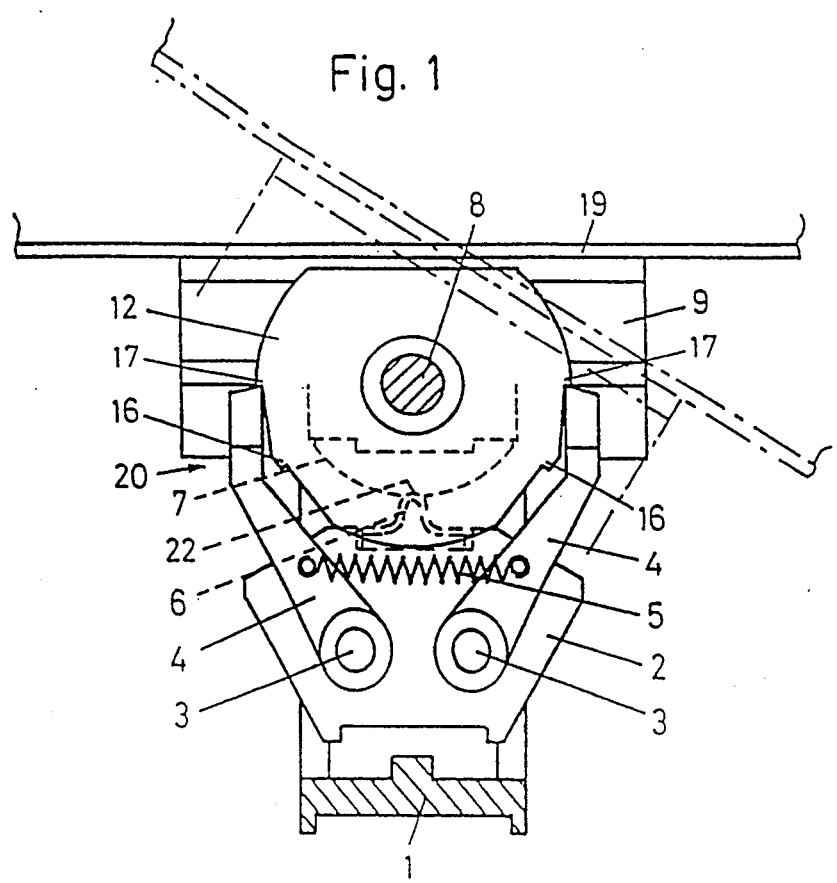
FIG. 1 is a sectional view along line I—I of FIG. 3.

By means of a locking device 20, carrying tray 19 is releasably locked in the horizontal position as well as in the two oblique positions. For this purpose, the tray is provided with a locking disc 12 that is equipped with locking projections 16 and 17 that are fastened to lock support 9 and are thus fixed to carrying tray 19. An adjustment disc 11 connected with release arm 10 is also disposed on shaft 8 in addition to locking disc 12 and, when seen in the direction of shaft 8, is provided with adjustment cams 14 and 15, respectively, in front of each locking projection. The locking device additionally comprises two symmetrically arranged detent pawls 4 which are pivotally mounted at pins 3 that are fixed to frame 1 and are part of an abutment support 2. In the horizontal position of transporting tray 19 shown in FIG. 1, both detent pawls 4 engage at locking disc 12 under the tension of a spring 5 and lock locking disc 12 and the transporting tray 19 fastened thereon against tilting about shaft 8. From this position, transporting tray 19 can be pivoted, for example, clockwise in FIG. 1 in that a corresponding movement of push rods 13 causes release arm 10 to be likewise pivoted clockwise about shaft 8. During this movement, the adjustment disc 11 traveling together with release arm 10 radially deflects the free ends of detent pawls 4 by means of adjustment cams 15 so that detent pawls 4 are lifted away from locking projections 17. Locking disc 12 is thus unlocked and is able to be tilted accordingly together with adjustment disc 11 and transporting tray 19 into a position suitable for discharging a piece of goods. Once this oblique position is attained, one of the detent pawls 4 slides, under tension of spring 5, underneath one of the locking projections 16 and thus prevents transporting tray 19 from pivoting back. Tipping over of transporting tray 19 is prevented by locking support 9 lying against abutment support 2. It is now important in this connection that pivoting back is prevented by the engagement of a detent pawl 4 at locking disc 12 even if push rods 13 are not in engagement with a sliding block 30 and are thus unable to support transporting tray 19. The sliding block 30 which cooperates with roller 26 can thus be comparatively short.

In order for transporting tray 19 to find its horizontal position more reliably and quickly when pivoting back into the horizontal position, a catch spring 6 is disposed on the abutment support. As soon as the mentioned horizontal position is attained, this catch spring engages in a detent groove 22 in a catch segment 7 fastened to lock support 9. Thus, in particular, the engagement of the detent pawls 4 in locking disc 12 to lock transporting tray 19 in the horizontal position is more reliably accomplished.

It will be understood that the above description of the present invention is susceptible to various modifications, changes and adaptations, and the same are intended to be comprehended within the meaning and range of equivalents of the appended claims.

What is claimed is:

1. A carriage for a conveyor for piece goods, the carriage including a transporting tray mounted on the frame of the carriage and a tilting device for tilting the transporting tray, wherein the transporting tray is automatically locked in the oblique position intended for the discharge of a piece of goods and adjustment means are provided for unlocking said oblique position by means of the tilting device, and wherein, in order to produce a lock on a horizontal shaft, there are provided a locking disc that is connected with the transporting tray and an adjustment disc that is connected with the tilting device, there being further provided at least one pivotal detent pawl that is connected with the frame of the carriage so as to be in engagement with the locking disc in said oblique position.

2. A carriage as defined in claim 1, wherein a release arm of the tilting device is fastened to the locking disc, with said release arm being placed preferably against the underside of the transporting tray in order to tilt it.

3. A carriage as defined in claim 1, wherein the catch element of a lock support is disposed at the underside of the transporting tray and a catch spring is connected with the carriage frame so as to engage in a detent groove of the catch segment when the transporting tray is in the horizontal position.

4. A carriage as defined in claim 3, wherein an abutment support is disposed at the carriage frame in order to limit the pivoting range of the transporting tray and said abutment support simultaneously serves as a carrier for the catch spring.

5. A carriage as defined in claim 1, wherein the transporting tray, when seen in the direction of movement, can be tilted to the left or right.

6. A carriage as defined in claim 5, wherein the tilting device includes a two-armed release arm that radially projects from the shaft, with the one part of the arm being placed against the carrying tray in the one pivoting direction and the other part of the arm in the other direction.

7. A carriage as defined in claim 5, wherein the locking disc is provided with four locking projections and the adjustment disc is provided with four adjustment cams.

8. A carriage as defined in claim 1, wherein the tilting device includes at least one push rod which can be moved vertically in order to tilt the transporting tray.

9. A carriage as defined in claim 1, wherein the tilting device is provided with a lever in the lower portion of the frame, with said lever being articulated to a push rod and to the frame and being provided with a roller which, in order to pivot the transporting tray can be brought into engagement.

10. A carriage as defined in claim 8, wherein said push rod is moved vertically by means of a sliding block.

11. A carriage as defined in claim 9 wherein said roller is brought into engagement by a sliding block.

* * * * *